(12) United States Patent
Moser et al.

(10) Patent No.: US 11,681,863 B2
(45) Date of Patent: Jun. 20, 2023

(54) REGULATORY DOCUMENT ANALYSIS WITH NATURAL LANGUAGE PROCESSING

(71) Applicant: CERNER INNOVATION, INC., Kansas City, KS (US)

(72) Inventors: Tyler Moser, Boyertown, PA (US); Dan Muir, Downingtown, PA (US); Manleen Sabharwal, Malvern, PA (US); Michael Graver, Eagleville, PA (US); Chandra Shaker Varma Pathapati, Wayne, PA (US); Jaqulin Maria Sebastian, Malvern, PA (US); Seetharaman Venkiteswaran, Malvern, PA (US)

(73) Assignee: CERNER INNOVATION, INC., Kansas City, KS (US)

( * ) Notice: Subject to any disclaimer, the term of this patent is extended or adjusted under 35 U.S.C. 154(b) by 16 days.

(21) Appl. No.: 17/132,432

(22) Filed: Dec. 23, 2020

(65) Prior Publication Data

US 2022/0198128 A1 Jun. 23, 2022

(51) Int. Cl.
*G06F 40/143* (2020.01)
*G06F 40/284* (2020.01)
*G06F 16/958* (2019.01)

(52) U.S. Cl.
CPC .......... *G06F 40/143* (2020.01); *G06F 16/986* (2019.01); *G06F 40/284* (2020.01)

(58) Field of Classification Search
CPC ...... G06F 16/986; G06F 40/14; G06F 40/117; G06F 40/166; G06F 40/194; G06F 40/197; G06F 40/143; G06F 40/284; G06F 16/9538; G06F 40/106; G06F 40/268
See application file for complete search history.

(56) References Cited

U.S. PATENT DOCUMENTS

| | | | |
|---|---|---|---|
| 6,560,620 B1 * | 5/2003 | Ching | G06F 40/14 707/999.203 |
| 2003/0237047 A1 * | 12/2003 | Borson | G06F 40/194 707/999.203 |
| 2005/0138540 A1 * | 6/2005 | Baltus | G06F 40/194 715/229 |
| 2016/0055196 A1 * | 2/2016 | Collins | G06F 16/23 707/690 |
| 2020/0302540 A1 * | 9/2020 | Xiu | G06N 5/04 |
| 2020/0311414 A1 * | 10/2020 | Enuka | G06V 30/418 |
| 2022/0035801 A1 * | 2/2022 | Baierl | G06F 16/2465 |
| 2022/0051132 A1 * | 2/2022 | Oke | G06F 40/284 |

* cited by examiner

*Primary Examiner* — Chau T Nguyen
(74) *Attorney, Agent, or Firm* — Kilpatrick Townsend & Stockton LLP

(57) ABSTRACT

Technologies are provided for automatically comparing versions of a regulatory document and highlighting meaningful changes to each version of the regulatory document. An analysis engine accepts two inputs of a regulatory document in HTML format. One input is an original version of the regulatory document and one input is a revised version of the regulatory document. The documents are processed by the analysis engine to highlight added content as compared to the original version of the HTML content and the second document being processed to highlight removed content as compared to the revised version of the HTML content. These highlighted documents are then presented to the user.

19 Claims, 6 Drawing Sheets

Federal Register :: Medicare Program; Inpatient Rehabilitation Facility Prospective Payment System for Federal Fiscal Year 2019

AGENCY:

Centers for Medicare & Medicaid Services (CMS), HHS.

ACTION:

410 — Final rule.

SUMMARY:

This final rule updates the prospective payment rates for inpatient rehabilitation facilities (IRFs) for federal fiscal year (FY) 2019. As required by the Social Security Act (the Act), this final rule includes the classification and weighting factors for the IRF prospective payment system's (PPS) case-mix groups and a description of the methodologies and data used in computing the prospective payment rates for FY 2019. This final rule also alleviates administrative burden for IRFs by removing the Functional Independence Measure (FIM™) instrument and associated Function Modifiers from the IRF Patient Assessment Instrument (IRF-PAI) beginning in FY 2020 and revises certain IRF coverage requirements to reduce the amount of required paperwork in the IRF setting beginning in FY 2019. Additionally, this final rule incorporates certain data items located in the Quality Indicators section of the IRF-PAI into the IRF case-mix classification system using analysis of 2 years of data beginning in FY 2020. For the IRF Quality Reporting Program (QRP), this final rule adopts a new measure, removal factor, removes two measures from the IRF QRP measure set, and codifies a number of program requirements in our regulations.

FIG. 4

Federal Register :: Medicare Program; Inpatient Rehabilitation Facility (IRF) Prospective Payment System for Federal Fiscal Year 2020 and Updates to the IRF Quality Reporting Program

AGENCY:

Centers for Medicare & Medicaid Services (CMS), HHS.

ACTION:

Proposed rule.

SUMMARY:

This proposed rule would update the prospective payment rates for inpatient rehabilitation facilities (IRFs) for federal fiscal year (FY) 2020. As required by the Social Security Act (the Act), this proposed rule includes the classification and weighting factors for the IRF prospective payment system's (PPS) case-mix groups (CMGs) and a description of the methodologies and data used in computing the prospective payment rates for FY 2020. We are proposing to rebase and revise the IRF market basket to reflect a 2016 base year rather than the current 2012 base year. Additionally, we are proposing to replace the previously finalized unweighted motor score with a weighted motor score to assign patients to CMGs and remove one item from the score beginning with FY 2020 and to revise the CMG relative weights and average length of stay values beginning with FY 2020 based on analysis of 2 years of data (FY 2017 and FY 2018). We are proposing to update the IRF wage index to use the concurrent FY inpatient prospective payment system (IPPS) wage index beginning with FY 2020. We are soliciting comments on stakeholder concerns regarding the appropriateness of the wage index used to adjust IRF payments. We are proposing to amend the regulations to clarify that the determination as to whether a physician qualifies as a rehabilitation physician (that is, a licensed physician with specialized training and experience in inpatient rehabilitation) is made by the IRF. For the IRF Quality Reporting Program (QRP), we are proposing to adopt two new measures, modify an existing measure, and adopt new standardized patient assessment data elements. We also propose to expand data collection to all patients, regardless of payer, as well as proposing updates related to the system used for the submission of data and related regulation text.

FIG. 5

REGULATORY DOCUMENT ANALYSIS WITH NATURAL LANGUAGE PROCESSING

BACKGROUND

Every year, the federal government releases new versions of existing regulatory documents. Currently, these documents are analyzed manually, and analysts compile a list of changes from the previous versions of the documents by hand. These changes are summarized before being presented to clients. As an example of the scope of this task, hundreds of hours spread over several months can be required on an annual basis. In addition to the delays in understanding the changes in regulations, the time, cost, and personnel required to analyze and summarize these documents is overwhelming.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to analyzing regulatory documents. More particularly, embodiments of the present invention automatically compares versions of a regulatory document and highlights meaningful changes to each version of the regulatory document. To do so, an analysis engine accepts two inputs of a regulatory document in HTML format. One input is an original version of the regulatory document and one input is a revised version of the regulatory document. The documents are processed by the analysis engine to highlight added content as compared to the original version of the HTML content and the second document being processed to highlight removed content as compared to the revised version of the HTML content. These highlighted documents are then presented to the user.

BRIEF DESCRIPTION OF THE DRAWINGS

The present invention is described in detail below with reference to the attached drawing figures, wherein:

FIGS. 4-5 depict illustrative regulatory documents that have been highlighted by a document analysis engine, in accordance with embodiments of the present disclosure;

DETAILED DESCRIPTION

Figure 1:
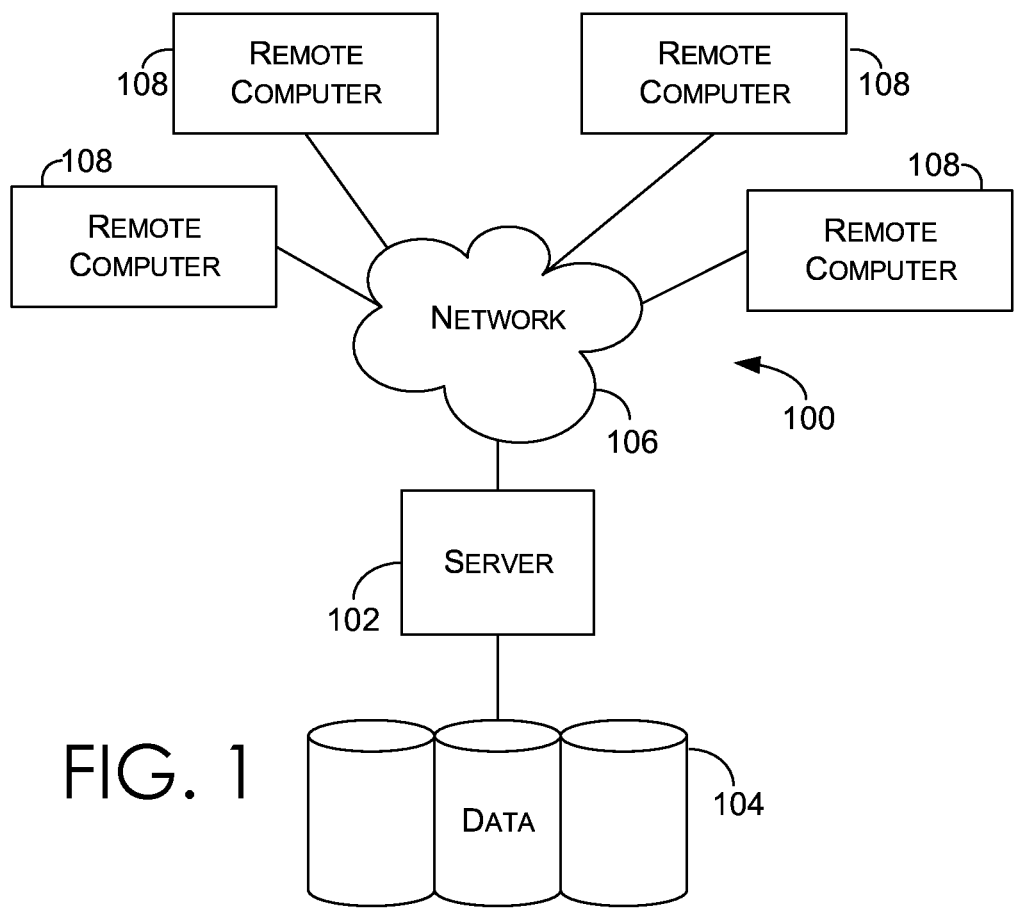
FIG. 1 is a block diagram of an exemplary computing environment suitable for use in implementing the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted in the Background, the federal government releases new versions of existing regulatory documents every year. Currently, these documents are analyzed manually, and analysts compile a list of changes from the previous versions of the documents by hand. These changes are summarized before being presented to clients. As an example of the scope of this task, hundreds of hours spread over several months can be required on an annual basis. In addition to the delays in understanding the changes in regulations, the time, cost, and personnel required to analyze and summarize these documents is overwhelming.

Embodiments of the present invention relate to analyzing regulatory documents. More particularly, embodiments of the present invention automatically compares versions of a regulatory document and highlights meaningful changes to each version of the regulatory document. To do so, an analysis engine accepts two inputs of a regulatory document in HTML format. One input is an original version of the regulatory document and one input is a revised version of the regulatory document. The documents are processed by the analysis engine to highlight added content as compared to the original version of the HTML content and the second document being processed to highlight removed content as compared to the revised version of the HTML content. These highlighted documents are then presented to the user. Although embodiments the regulatory document in HTML format, it is contemplated and within the scope of the present invention that the regulatory document may be in and/or accepted in other formats.

Accordingly, in one aspect, an embodiment of the present invention is directed to a method. The method includes receiving, from a webserver, a first document and a second document. The first document is a revised version of Hypertext Markup Language (HTML) content and the second document is an original version of the HTML content. The method also includes processing the first document and the second document. The first document is processed to highlight added content as compared to the original version of the HTML content. The second document is processed to highlight removed content as compared to the revised version of the HTML content. The method further includes presenting the processed first document and the processed second document.

In another aspect of the invention, an embodiment is directed to one or more computer storage media having computer-executable instructions embodied thereon that, when executed by a computer, causes the computer to perform operations. The operations receiving, from a webserver, a first document and a second document. The first document is a revised version of HTML content and the second document is an original version of the HTML content. The operations also include processing the first document and the second document. The first document is processed to highlight added content as compared to the original version of the HTML content. The second document is processed to highlight removed content as compared to the revised version of the HTML content. The operations further include presenting the processed first document and the processed second document.

In a further aspect, an embodiment is directed to a system that includes one or more processors and a non-transitory computer storage medium storing computer-useable instructions that, when used by the one or more processors, cause the one or more processors to: receive, from a webserver, a first document and a second document, the first document being a revised version of HTML content and the second document being an original version of the HTML content; process the first document and the second document, the first document being processed to highlight added content as compared to the original version of the HTML content and the second document being processed to highlight removed content as compared to the revised version of the HTML content; and present the processed first document and the processed second document.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/government regulatory bodies not otherwise mentioned. Clinicians may comprise a treating physician or physicians; specialists such as intensivists, surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
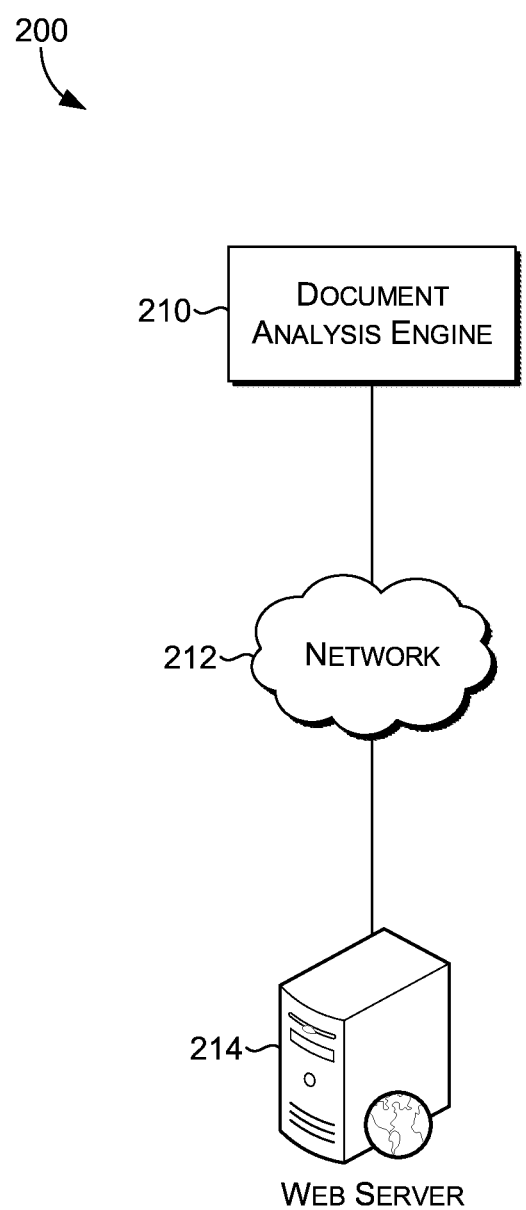
FIG. 2 is a block diagram of an exemplary system for providing regulatory document analysis with natural language processing, in accordance with an embodiment of the present disclosure.

Turning now to FIG. 2, a regulatory analysis system 200 is depicted suitable for use in implementing embodiments of the present invention. The regulatory analysis system 200 is merely an example of one suitable computing system environment and is not intended to suggest any limitation as to the scope of use or functionality of embodiments of the present invention. Neither should the regulatory analysis system 200 be interpreted as having any dependency or requirement related to any single module/component or combination of modules/components illustrated therein.

The regulatory analysis system 200 includes document analysis engine 210, and webserver 214, all in communication with one another via a network 210. The network 210 may include, without limitation, one or more secure local area networks (LANs) or wide area networks (WANs). The network 210 may be a secure network associated with a facility such as a healthcare facility. The secure network may require that a user log in and be authenticated in order to send and/or receive information over the network.

The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, document analysis engine 210 might reside on a server, cluster of servers, or a computing device remote from one or more of the remaining components. Although illustrated as separate systems, the functionality provided by each of these components might be provided as a single component/module. The single unit depictions are meant for clarity, not to limit the scope of embodiments in any form.

Components of the regulatory analysis system 200 may include a processing unit, internal system memory, and a suitable system bus for coupling various system components, including one or more data stores for storing information (e.g., files and metadata associated therewith). Components of the regulatory analysis system 200 typically includes, or has access to, a variety of computer-readable media.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Document analysis engine 210 includes or has access to infrastructure that is capable of receiving, for example, information from web server 214. The information received in association with document analysis engine 210 may comprise regulatory documents. For example, in a healthcare context, the federal government releases new versions of existing regulatory documents each year. In order to comply with regulations, a healthcare institution must ensure that any changes from year to year are duly noted. If healthcare software is utilized by the healthcare institution, it is imperative that necessary changes be made to the software as well.

Document analysis engine 210 also includes or has access to infrastructure that is capable of storing information. For example, various versions of regulatory documents, such as a previous year's version, proposed revisions for the current year, or final revisions for the current year may be stored. Highlighted versions of HTML documents as generated by document analysis engine 210 and described herein may also be stored.

Generally, the document analysis engine 210 is configured to accept an input for each of the old and new document versions. The documents are received as HTML content from web server 214 that hosts a website providing HTML content. For example, the web server 214 hosts a Federal Register webpage. The web server 214 may be where regulatory documents are made available to the public. The document analysis engine 210 processes the documents and produces two HTML documents as output. One output is the new version of the document with added content highlighted in green, for example. The other output is the old version of the document with removed content highlighted in red, for example. These highlighted documents are then presented to the user. Importantly, two complete HTML documents have been rebuilt with highlighting and presented to the user.

Although not shown in FIG. 2, a user device may be configured to display information to a user via a display. The information may include various versions of regulatory documents, such as a previous year's version, proposed revisions for the current year, or final revisions for the current year. The user device may also present information such as highlighted versions of HTML documents as generated by document analysis engine 210 to a user via the display. Embodiments are not intended to be limited to visual display but rather may also include audio presentation, visual presentation, combined audio/visual presentation, and the like.

User device may be any type of computing device used within a healthcare facility or as part of the regulatory process to receive, display, and send information to another user or system. User device may be capable of communicating via the network 212 with document analysis engine 210, or webserver 214. Such devices may include any type of mobile and portable devices including cellular telephones, personal digital assistants, tablet PCs, smart phones, and the like.

Figure 3:
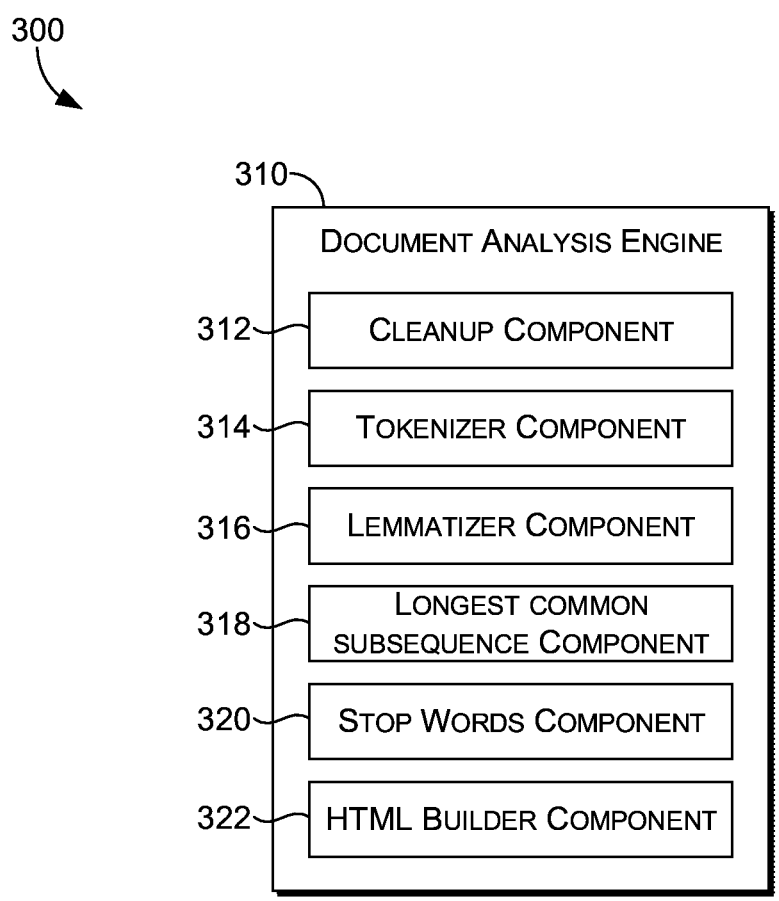
FIG. 3 is a block diagram of an exemplary implementation of a document analysis engine, in accordance with some embodiments of the present disclosure.

Referring now to FIG. 3, the document analysis engine 310 includes several components. For example, the document analysis engine 310 may include cleanup component 312, tokenizer component 314, lemmatizer component 316, longest common subsequence component 318, stop words component 320, and HTML builder component 322. Initially, cleanup component 312 generally cleans the HTML provided on the Federal Register website. For each document that is released, the federal register provides at least two official releases of a particular document. One is a PDF file and the other is Extensible Markup Language (XML). The federal register website also includes the full document on a webpage that links to these two formats. Since the webpage already includes the full document in HTML format, the webpage is downloaded as an HTML file and received by the cleanup component 312.

The HTML content available on the Federal Register website includes the full document, but also includes a significant amount of unneeded content. For example, unneeded content may include dropdowns, extraneous formatting, page numbers, and other unwanted elements. Cleanup component 312 removes the unneeded content so that the other components can focus on the information portion of the document. To do so, cleanup component 312 extracts the document from the full HTML file and coerces the partial HTML structure into a valid HTML document. Next, cleanup component 312 converts the HTML document into a tree data structure. A recursive algorithm is used to traverse the tree and remove unneeded content. Finally, cleanup component 312 converts the tree data structure back to HTML format. For clarity, cleanup component 312 cleans both documents being compared.

Tokenizer component 314 generally, takes the HTML and splits it into tokens. Typically, the tokens are a single word. Conventional tokenizers do not understand HTML structure and a single HTML tag could be split into many different tokens. Tokenizer component 314 is HTML-sensitive and identifies HTML tags and creates a single token for each tag.

In embodiments, tokenizer component 314 utilizes an HTML parser to convert the HTML into a tree structure, and then recursively navigates that tree. However, unlike the cleanup component 312, tokenizer component 304 does not prune the tree. Each node of the tree represents an HTML tag. For each node, the corresponding tag is added to the list of tokens and the tokenizer component 314 tokenizes the text content inside that tag.

Lemmatizer component 316 generally simplifies text content into root words. By simplifying each word into its root word, document analysis engine 310 can ignore superficial changes to document text when comparing documents. For example, lemmatizer component 316 enables document analysis engine 310 to recognize that a sentence that has changed tense has not actually changed its core meaning. Such a change can be ignored and should not be highlighted. Lemmatizer component 316 may also identify part of speech to assist in the simplification process.

Longest common subsequence component 318 generally compares the two versions of the document. To do so, longest common subsequence component 318 may use the longest common subsequence (LCS) algorithm. Generally, the LCS algorithm can be used to compare text files line-by-line and identify differences between the text files. Instead longest common subsequence component 318 modifies the LCS algorithm to compare the lists of lemmatized tokens for both documents and produces a list of document slices. Each slice corresponds to a section of the document that has changed.

Because the regulatory documents being processed are incredibly detailed, the regulatory analysis engine 310 cannot afford to miss changes to the document. The LCS algorithm runtime complexity grows for each token in both documents being compared. This is performant enough for line-by-line comparison, but quickly grows to take unreasonable amounts of time when comparing every token. To reduce runtime complexity without sacrificing the quality of output, longest common subsequence component 318 hashes each token. Accordingly, the compile can make optimizations knowing that every token will have equal size. Additionally, the number of comparisons can be reduced by ignoring unique tokens since unique tokens will never match another token.

Rust module component 318 may also convert one of the documents into a map, where the key is the token and the value is a list of every index where that token appears. This further reduces the runtime by allowing regulatory analysis engine 310 to cut down on the amount of searching that is perform through the documents. Additionally, rust module component 306 may reduce buffer-zeroing by tracking which buffer segments need to be cleared. This allows regulatory analysis engine 310 to only zero out the buffer segments that need to be cleared, instead of wasting clock cycles zeroing every index.

Stop words component 320 generally receives the output of the rust module component 318 and removes highlighted sections of the document that are made up of stop words. Stop words refer to words that do not add significant meaning (e.g., "I", "me", "you", or "it"). These words may change between document versions, but since they convey little meaning, they do not need to be highlighted. Stop words component 320 ignores differing slices of the document that are made up exclusively of stop words. This minimizes the highlighted content to only include meaningful changes.

Stop words component 320 may receive two pieces of data, the slices produced by the rust module component 318 and the lemmatized tokens produced by the lemmatizer component 316. Stop words component 320 loops through each slice and checks each token in the respective slice to see if a token is included in the list of stop words. If so, stop words component 320 removes the slice. After removing the slices, stop words component 320 recalculates the indices corresponding to each slice. In embodiments, stop words component 320 may remove highlighting on sections of the document containing stop words.

HTML builder component 322 combines the data generated by the other components to build the final output of the analysis engine 310. The output is presented as two HTML documents, one for each version of the document. To do so, HTML builder component 322 receives three sets of data: the modified differing slices produced by rust module component 318 and stop words component 320, the cleaned-up HTML from the federal register website produced by cleanup component 312, and the un-modified token lists produced by the tokenizer component 314. HTML builder component 322 pairs each token with any whitespace that precedes that token. The whitespace is calculated by consuming the document, token by token. Each slice is looped through, concatenating tokens with their associated whitespace to rebuild the complete document. For the changed portion of each slice, HTML builder component 322 inserts HTML mark tags to add highlighting to the changed sections. Because mark tags cannot contain other tags, HTML builder component 322 also closes, and then re-opens, mark tags around other tags occurring in the slice. Finally, HTML builder component 322 adds some additional tags and a stylesheet to produce a more visually appealing output. HTML builder component 322 writes the output written as an HTML file. For clarity, HTML builder component 322 runs once for each of the two documents being produced.

As shown in FIG. 4, regulatory document 400 illustrates an exemplary document showing a final version of regulatory changes for the previous year that has been highlighted by a document analysis engine, such as the document analysis engine 210, 310 of FIGS. 2 and 3. For example, regulatory document 400 highlights text 410, 420 that has been changed by a subsequent version of the regulatory document. In this example, the text 410, 420 is highlighted to illustrate text that has been removed by the subsequent version of the regulatory document. In embodiments, removed text may be highlighted in red to distinguish it from added text.

Referring to FIG. 5, regulatory document 500 illustrates an exemplary document showing a proposed version of regulatory changes for the current year that has been highlighted by a document analysis engine, such as the document analysis engine 210, 310 of FIGS. 2 and 3. For example, regulatory document 500 highlights text 510, 520 that has been changed since a previous version of the regulatory document. In this example, the text 510, 520 is highlighted to illustrate text that has been added since the previous version of the regulatory document. In embodiments, added text may be highlighted in green to distinguish it from removed text.

Figure 6:
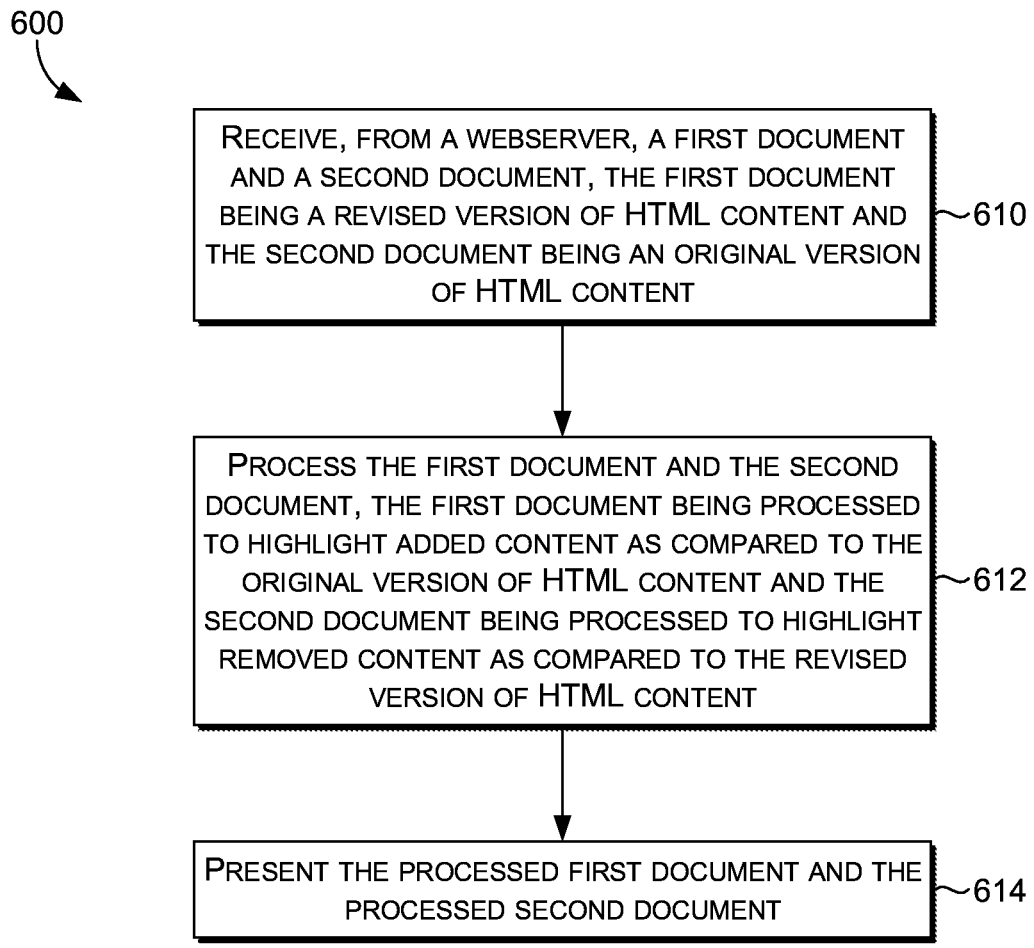
FIG. 6 is a flow diagram showing an exemplary method for providing regulatory document analysis with natural language processing, in accordance with various embodiments of the present disclosure.

In FIG. 6, a flow diagram is provided illustrating a method 600 for providing regulatory document analysis with natural language processing, in accordance with various embodiments of the present disclosure, in accordance with various embodiments of the present disclosure. Method 600 may be performed by any computing device (such as computing device described with respect to FIG. 1) with access to an regulatory analysis system (such as the one described with respect to FIG. 2) or by one or more components of the regulatory system (such as the document analysis engine described with respect to FIGS. 2 and 3).

Initially, as shown at step 610, a first document and a second document are received. In embodiments, the URLs to each of the first and second document may be provided to a document analysis engine (such as document analysis engine 310 of FIG. 3) by an analyst via an analyst device. Accordingly, the document analysis engine may download the HTML content at each URL. The first document may be an original version HTML content and the second document is a revised version of the HTML content.

At step 612, the first document and the second document are processed. The first document is processed to highlight added content as compared to the original version of HTML content and the second document is processed to highlight removed content as compared to the revised version of HTML content.

In embodiments, the processing comprises cleaning the first document and the second document. Initially, the cleaning may comprise removing extraneous content from the first document and the second document. For example, the extraneous content may include dropdowns, links, additional formatting, page numbers, or other unneeded elements. Next, the removing may comprise converting the first document and the second document into tree data structures. The tree data structures may be traversed with a recursive algorithm that removes the extraneous content. Finally, the tree data structures are converted back to HTML.

In embodiments, the processing further comprises tokenizing the first document and the second document. The tokenizer may be HTML-sensitive and able to recognize HTML tags. Initially, the first document and the second document are converted into tree data structures. Each node of the tree data structures are an HTML tag. Each HTML tag is added to a list of tokens and the tree data structures are recursively navigated to tokenize text content inside each HTML tag.

In embodiments, the processing further comprises lemmatizing the first document and the second document. To do so, each token of the tokenized text is simplified into root tokens for the first document and the second document.

In embodiments, the processing further comprises comparing the root tokens of the first document to the root tokens of the second document. Prior to the comparing, the root tokens of the first document and the second document may be hashed. Unique tokens of the hashed root tokens of the first document and the second document are removed. The first document or the second document is converted into a map, where each key of the map is a token of the hashed root tokens and a value of each key is a list of each index where the hashed root token appears. Buffer-zeroing may be reduced by tracking buffer segments that need to be cleared.

In embodiments, the processing further comprises removing stop words from the lemmatized first document and second document. Initially, the map produced by the lemmatizing is received. Each hashed root token in the received map that is included in a list of stop words is removed and indices corresponding to the value of each key are recalculated.

In embodiments, the processing further comprises building highlighted HTML for the first document and the second document. The lemmatized first document and the lemmatized second document that has the stop words removed may be initially received. Additionally, the cleaned first document and the cleaned second document are received. After the tokenized first document and the tokenized second document is received, each token of the tokenized first document and the tokenized second document are concatenated with whitespace preceding each respective token. HTML mark tags are inserted to add highlighting to changed portions of the concatenated tokenized first document relative to the cleaned second document and the concatenenated tokenized second document relative to the cleaned first document.

At step 614, the processed first document and the processed second document are presented. Each of the processed documents enable a user to readily ascertain any changes or deletions that have been made to the content of a current version or the previous version of the regulatory document. For example, the processed first document and the processed second document may have highlights similar to the highlights in the documents illustrated in FIGS. 4 and 5.

As can be understood, the present invention provides systems, methods, and user interfaces for providing regulatory document analysis with natural language processing.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

We claim:

1. A computerized method comprising:
receiving, from a web server, a first document in (Hypertext Markup Language) HTML format and a second document in the HTML format, the first document being a revised version and the second document being an original version;
converting the first document from the HTML format into a first tree data structure and the second document from the HTML format into a second tree data structure;
cleaning the first and second documents by removing one or more webpage-specific elements from the first and second tree data structures;
subsequent to cleaning, converting the first tree data structure back into the HTML format for the first document and the second tree data structure back into the HTML format for the second document;
autonomously highlighting, in the first document by a document analysis engine subsequent to cleaning, content that was added to the first document as compared to the second document;
autonomously highlighting, in the second document by the document analysis engine subsequent to cleaning, content that was removed from the second document as compared to the first document; and
generating and causing display of a graphical user interface that concurrently displays the first document in the HTML format with the added content highlighted and the second document in the HTML format with removed content highlighted.

2. The method of claim 1, wherein the cleaning further comprises removing one or more of dropdowns, links, or other webpage-specific elements.

3. The method of claim 2, wherein the removing comprises:
traversing the first and second tree data structures with a recursive algorithm that removes the one or more webpage-specific element.

4. The method of claim 1, further comprising tokenizing, with a tokenizer component, the first document and the second document.

5. The method of claim 4, wherein the tokenizer component is HTML-sensitive and recognizes HTML tags.

6. The method of claim 4, wherein tokenizing the first and second documents comprises:
converting the first document and the second document into tree data structures, each node of the tree data structures being an HTML tag;
adding, where each node in the first and second tree data structures includes an HTML tag, each HTML tag to a list of tokens; and
recursively navigating the first and second tree data structures to tokenize text content inside each HTML tag.

7. The method of claim 4, further comprising lemmatizing the first document and the second document.

8. The method of claim 7, wherein the lemmatizing further comprises simplifying tokens of the first document and second document into root tokens for the first document and the second document.

9. The method of claim 8, further comprising comparing the root tokens of the first document to the root tokens of the second document.

10. The method of claim 9, further comprising, prior to the comparing, hashing the root tokens of the first document and the second document.

11. The method of claim 10, further comprising removing unique tokens of the hashed root tokens of the first document and the second document.

12. The method of claim 11, further comprising converting the first document or the second document into a map, wherein each key of the map is a token of the hashed root tokens and a value of each key is a list of each index where the hashed root token appears.

13. The method of claim 12, further comprising reducing buffer-zeroing by tracking buffer segments that need to be cleared.

14. The method of claim 12, further comprising removing stop words from the lemmatized first document and second document.

15. The method of claim 14, wherein the removing stop words comprises:
receiving the map produced by the lemmatizing;
removing each hashed root token in the map that is included in a list of stop words; and
recalculating indices corresponding to the value of each key.

16. The method of claim 14, further comprising building highlighted HTML, for the first document and the second document.

17. The method of claim 16, wherein the building highlighted HTML comprises:
receiving the lemmatized first document and the lemmatized second document that has the stop words removed;
receiving the cleaned first document and the cleaned second document;
receiving the tokenized first document and the tokenized second document;
concatenating each token of the tokenized first document and the tokenized second document with whitespace preceding each respective token; and
inserting HTML mark tags to add highlighting to changed portions of the concatenated tokenized first document relative to the cleaned second document, and the concatenated tokenized second document relative to the cleaned first document.

18. One or more computer storage media having computer-executable instructions embodied thereon that, when executed by a computer, causes the computer to perform operations comprising:
via one or more processors:
receiving, from a web server, a first document in (Hypertext Markup Language) HTML format and a second document in the HTML format, the first document being a revised version and the second document being an original version;

converting the first document from the HTML format into a first tree data structure and the second document from the HTML format into a second tree data structure;

cleaning the first and second documents by removing one or more webpage-specific elements from the first and second tree data structures;

subsequent to cleaning, converting the first tree data structure back into the HTML format for the first document and the second tree data structure back into the HTML format for the second document;

autonomously highlighting, in the first document by a document analysis engine subsequent to cleaning, content that was added to the first document as compared to the second document;

autonomously highlighting, in the second document by the document analysis engine subsequent to cleaning, content that was removed from the second document as compared to the first document; and generating and causing display of a graphical user interface that concurrently displays first document in the HTML format with the added content highlighted and the second document in the HTML format with the removed content highlighted.

19. A system comprising:

one or more processors; and a non-transitory computer storage media storing computer-useable instructions that, when used by the one or more processors, cause the one or more processors to:

receive, from a web server, a first document in (Hypertext Markup Language) HTML format and a second document in the HTML format, the first document being a revised version and the second document being an original version;

convert the first document from the HTML format into a first tree data structure and the second document from the HTML format into a second tree data structure;

clean the first and second documents by removing one or more webpage-specific elements from the first and second tree data structures;

subsequent to cleaning, convert the first tree data structure back into the HTML format for the first document and the second tree data structure back into the HTML format for the second document;

autonomously highlighting, in the first document by a document analysis engine subsequent to cleaning, content that was added to the first document as compared to the second document;

autonomously highlighting, in the second document by the document analysis engine subsequent to cleaning, content that was removed from the second document as compared to the first document; and generate and cause display of a graphical user interface that concurrently displays first document in the HTML format with the added content highlighted and the second document in the HTML format with the removed content highlighted.

* * * * *